United States Patent
Li

(10) Patent No.: US 12,261,458 B2
(45) Date of Patent: Mar. 25, 2025

(54) ALL-IN-ONE WIRELESS CHARGER

(71) Applicant: Shenzhen Mgctech Co., Ltd, Shenzhen (CN)

(72) Inventor: Jiedan Li, Shenzhen (CN)

( * ) Notice: Subject to any disclaimer, the term of this patent is extended or adjusted under 35 U.S.C. 154(b) by 24 days.

(21) Appl. No.: 18/736,432

(22) Filed: Jun. 6, 2024

(65) Prior Publication Data
US 2024/0322608 A1 Sep. 26, 2024

(30) Foreign Application Priority Data

Mar. 5, 2024 (CN) .......................... 202420415366.4

(51) Int. Cl.
| | | |
|---|---|---|
| *H02J 50/40* | (2016.01) | |
| *H02J 7/00* | (2006.01) | |
| *H02J 50/00* | (2016.01) | |
| *H02J 50/10* | (2016.01) | |
| *H02J 50/90* | (2016.01) | |
| *H02K 11/00* | (2016.01) | |

(52) U.S. Cl.
CPC ............ *H02J 50/40* (2016.02); *H02J 7/0044* (2013.01); *H02J 50/005* (2020.01); *H02J 50/10* (2016.02); *H02J 50/90* (2016.02); *H02K 11/0094* (2013.01)

(58) Field of Classification Search
CPC ..................................................... H02J 7/0044
USPC ................................................. 320/114, 108
See application file for complete search history.

(56) References Cited

FOREIGN PATENT DOCUMENTS

| | | | |
|---|---|---|---|
| CN | 214205042 U | * | 9/2021 |
| CN | 220016901 U | * | 11/2023 |

* cited by examiner

*Primary Examiner* — Edward Tso
*Assistant Examiner* — Ahmed H Omar
(74) *Attorney, Agent, or Firm* — Daniel M. Cohn; Howard M. Cohn

(57) ABSTRACT

The present utility model discloses an all-in-one wireless charger, comprising: a base, a first ejecting mechanism, a second ejecting mechanism, a motherboard PCB, and a rotating case; The top surface of the base is oblique in relation to the bottom surface, and an oblique upper base cover is installed; The bottom surface of the rotating case is a cant matching the top surface of the base, and the bottom surface is rotatably connected to the upper base cover; The top surface is designed for mobile phone wireless charging, and the rotating case can help to rotatably adjust the top tilt angle of the wireless charging surface for mobile phones. The top tilt angle of the wireless charger of the present utility model can be adjusted by rotating the rotating case for meeting different requirements of users; The two sides of the all-in-one wireless charger have separate openings, which can respectively eject wireless charging components for earphones and watches, adding more charging ports for the wireless charger; The wireless charging components for earphones and watches can be pressed back into the base when not in use, making the wireless charger more aesthetically pleasing and portable.

10 Claims, 5 Drawing Sheets

ALL-IN-ONE WIRELESS CHARGER

FIELD OF THE UTILITY MODEL

The present utility model relates to the charger technology, in particular to an all-in-one wireless charger.

BACKGROUND

The contact power transmission method is increasingly incompetent in meeting practical needs. Wireless chargers are devices designed based on the electromagnetic induction principle for charging, which is similar to that for transformers. By placing a coil at the transmitting and receiving ends, the transmitting end coil can send electromagnetic signals to the outside under the action of electricity, while the receiving end coil can receive the electromagnetic signals and convert them into current, thereby achieving the purpose of wireless charging. The wireless charging technology is a special power supply method that does not require power cords, and therefore electromagnetic wave energy can be converted into electrical energy through electromagnetic wave propagation for the sake of wireless charging;

Traditional wireless charging devices are unavailable for simultaneously charging wireless Bluetooth earphones, electronic watches and mobile phones, so more than one wireless charging device is needed on desktops, which always cause a increase of costs in addition to messy desktop. Therefore, the present utility model proposes a three-in-one desktop wireless charger to solve the issues in the prior art.

DESCRIPTION OF THE UTILITY MODEL

The present utility model proposes an all-in-one wireless charger to solve the issues in the prior art mentioned above.

The technical solution adopted for the present utility model is:

The present utility model proposes an all-in-one wireless charger, comprising:

A base—The top surface of the base is oblique in relation to the bottom surface, and an oblique upper cover is installed; A first opening and a second opening are respectively set at different heights on the left and right sides;

A rotating case—The bottom surface of the rotating case is a cant matching the top surface of the base, and the bottom surface is rotatably connected to the upper base cover; The top surface is designed for mobile phone wireless charging, while the inside is provided with a corresponding wireless charging component; The rotating case can help to rotatably adjust the top tilt angle of the wireless charging surface for mobile phones;

A first ejecting mechanism—The first ejecting mechanism is installed inside the base and provided with an earphone wireless charging component; The first ejecting mechanism can drive the earphone wireless charging component to eject from the first opening;

A second ejecting mechanism—The second ejecting mechanism is provided with a watch wireless charging component and can drive the watch wireless charging component to eject from the second opening;

A motherboard PCB—The motherboard PCB is installed inside the base and electrically connected to the charging coils of the wireless charging components for mobile phones, earphones and watches.

Furthermore, the rotating case has a rotating motor and a control board for controlling the rotating motor; The rotating shaft of the rotating motor passes through the bottom surface of the rotating case and is perpendicular to the top surface of the base; Limit stoppers are connected to the rotating shaft of the rotating motor, and a connection slot in the middle of the upper base cover is fixedly connected.

Furthermore, the first opening is set relatively parallel to the bottom surface of the base, and the second opening is set obliquely in relation to the bottom surface of the base.

Furthermore, when the rotating case rotates until the top surface is parallel to the bottom surface of the base, the rotating case and the base form a rectangle as a whole.

Furthermore, the first and second ejecting mechanisms can be used in an electric mode or a manual mode.

Furthermore, in the electric mode: It further comprises a first electric mechanism and a second electric mechanism installed in the base; The first electric mechanism drives the first ejecting mechanism to extend and retract from the first opening, while the second electric mechanism drives the second ejecting mechanism to extend and retract from the second opening.

Furthermore, the manual mode is described as that:

The first ejecting mechanism comprises:

A first spring upper seat—Spring slots are designed near the front and rear sides, a self-locking switch is provided at one end, and both ends of each spring slot are provided with limit stoppers with plugholes;

Spring guide shafts—They are set between the two limit stoppers of the spring slots and springs are used;

An ejecting buckle—Both ends of the ejecting buckle are provided with ears with guide holes; The upper surface in the middle is connected to the earphone wireless charging component, and a self-locking buckle corresponding to the self-locking switch is provided on one side; The ears are fit on the spring guide shafts; When the earphone wireless charging component is pressed into the first opening, the ears will slide along the spring guide shafts and compress the spring. The watch wireless charging component can move between the two spring slots until the self-locking buckle is locked in conjunction with the self-locking switch;

A first spring lower cover—It is installed below the first spring upper seat to radially seal the spring slots as well as the lower part of the sliding space of the earphone wireless charging component.

The second ejecting mechanism comprises:

A second spring bottom seat—Spring slots are designed near the front and rear sides, a self-locking switch is provided at one end, and both ends of each spring slot are provided with limit stoppers with plugholes;

Spring guide shafts—They are set between the two limit stoppers of the spring slots and springs are used;

An ejecting buckle—Both ends of the ejecting buckle are provided with ears with guide holes; The upper surface in the middle is connected to the watch wireless charging component, and a self-locking buckle corresponding to the self-locking switch is provided on one side; The ears are fit on the spring guide shafts; When the watch wireless charging component is pressed into the second opening, the ears will slide along the spring guide shafts and compress the spring. The watch wireless charging component can move between the two spring slots until the self-locking buckle is locked in conjunction with the self-locking switch;

A second spring upper cover—It is installed over the second spring bottom seat to radially seal the spring slots as well as the upper part of the sliding space of the watch wireless charging component.

Both wireless charging components for earphones and watches comprise: an upper charging cover and a lower charging cover that are mutually buckled, as well as a charging coil set in the installation space formed between the upper charging cover and lower charging cover.

The mobile phone wireless charging component comprises: a decorative piece set on the top surface of the rotating case, a mobile phone charging coil set the inner side of the decorative piece inside the rotating case and a magnet set installed around the mobile phone charging coil.

Preferably, the upper charging cover of the earphone wireless charging component is provided with a silicone pad.

Furthermore, the bottom surface of the base is provided with a lower cover, and silicone pads are affixed at the four bottom surface corners of the lower cover.

Compared with the prior art, the wireless charging surface of the all-in-one wireless charger for mobile phones proposed in the present utility model is set on the top surface of the wireless charger, and the top tilt angle of the top surface can be adjusted by rotating the rotating case for meeting different requirements of users; The two sides of the all-in-one wireless charger have separate openings, which can respectively eject wireless charging components for earphones and watches, adding more charging ports for the wireless charger; The wireless charging components for earphones and watches can be pressed back into the base when not in use, making the wireless charger more aesthetically pleasing and portable.

DESCRIPTION OF DRAWINGS

In order to make a clearer explanation of the technical solution in the embodiments of the present utility model, a brief introduction is given below to the drawings required in the embodiments or prior art descriptions. It is obvious that the drawings in the following description only relate to some embodiments of the present utility model. For those skilled in the art, other drawings can be obtained based on these drawings without creative labor.

Figure 1:
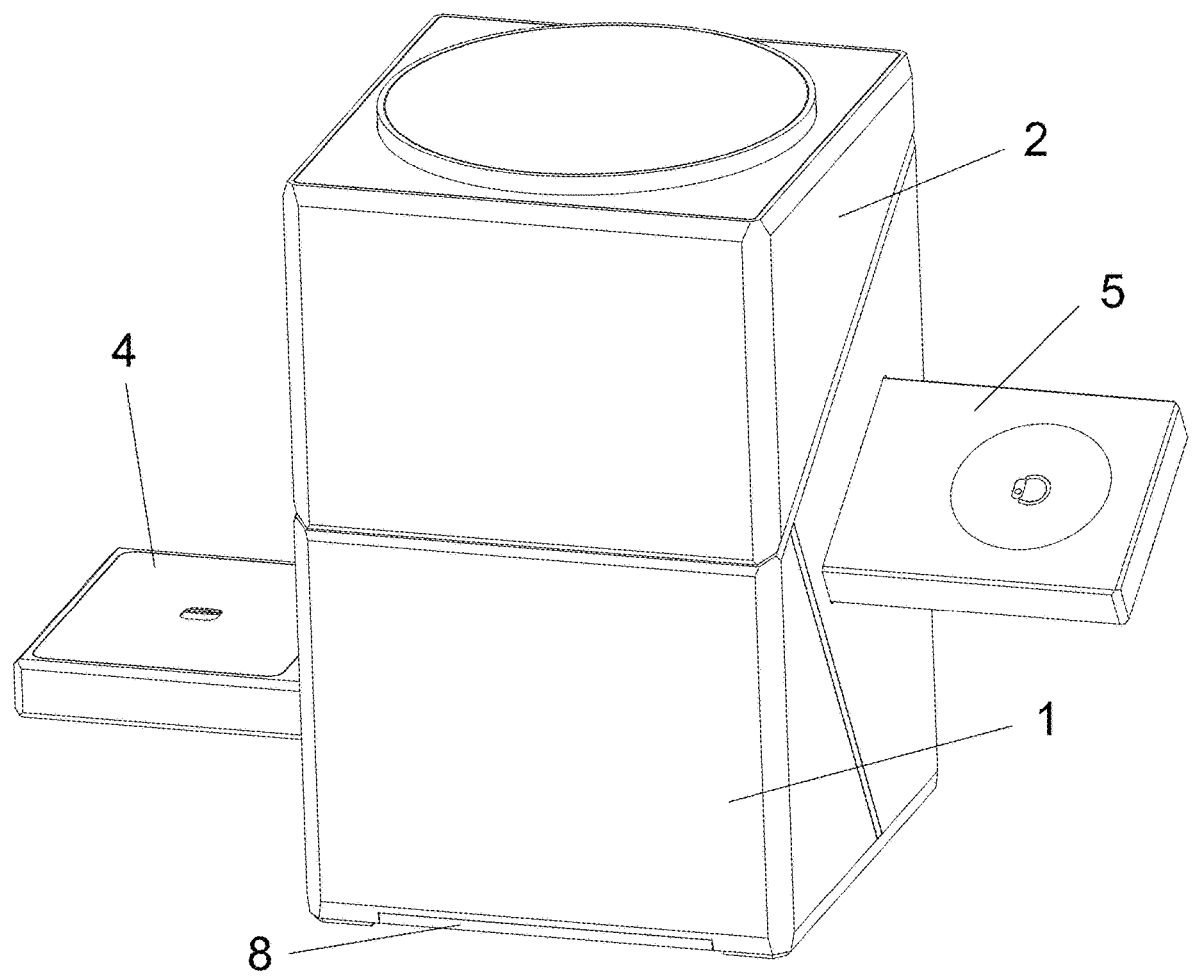
FIG. 1 shows a structure diagram of an embodiment of the present utility model with charging components extended on both sides.
Figure 2:
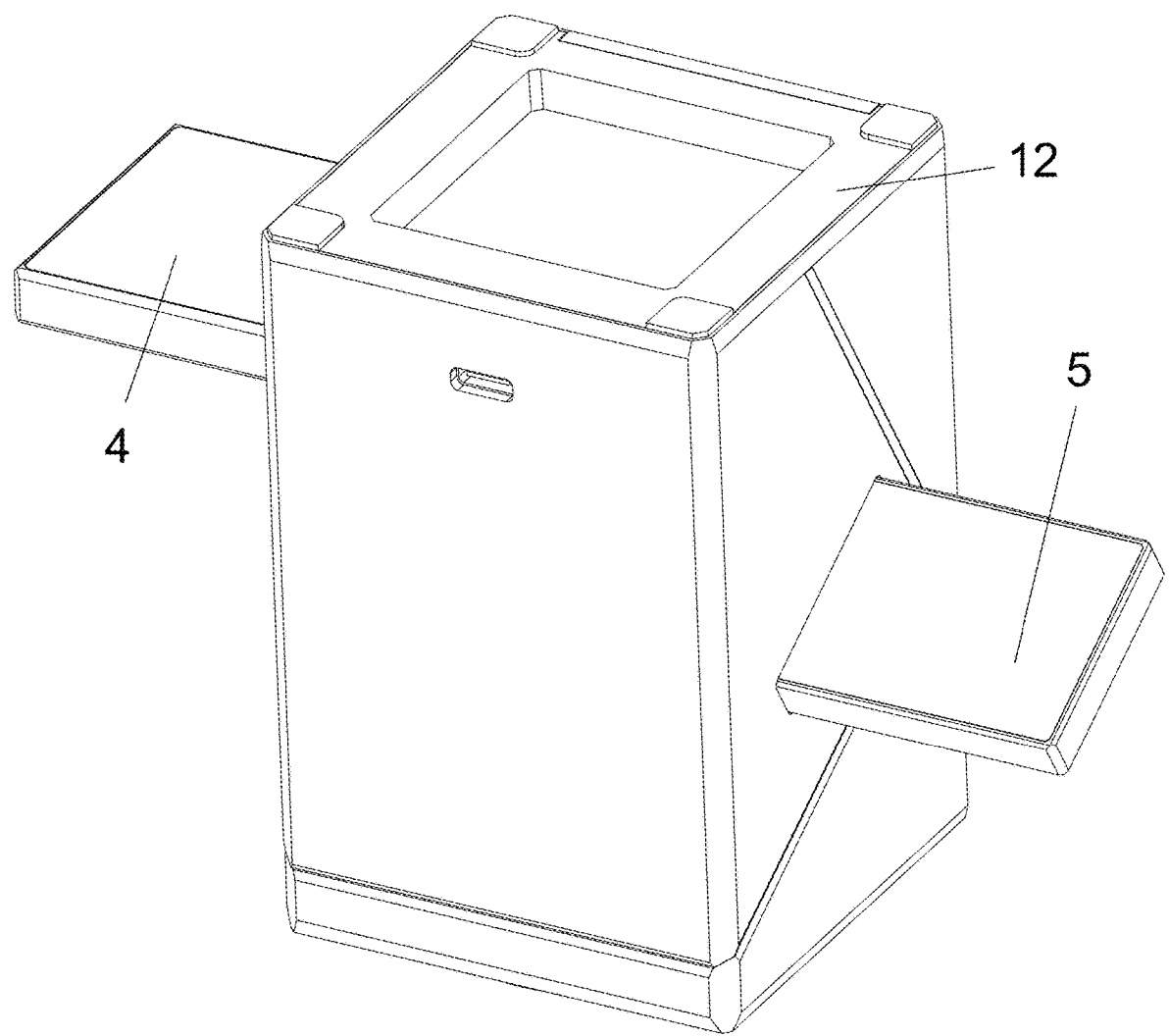
FIG. 2 shows a structure bottom view of an embodiment of the present utility model with charging components extended on both sides.
Figure 3:
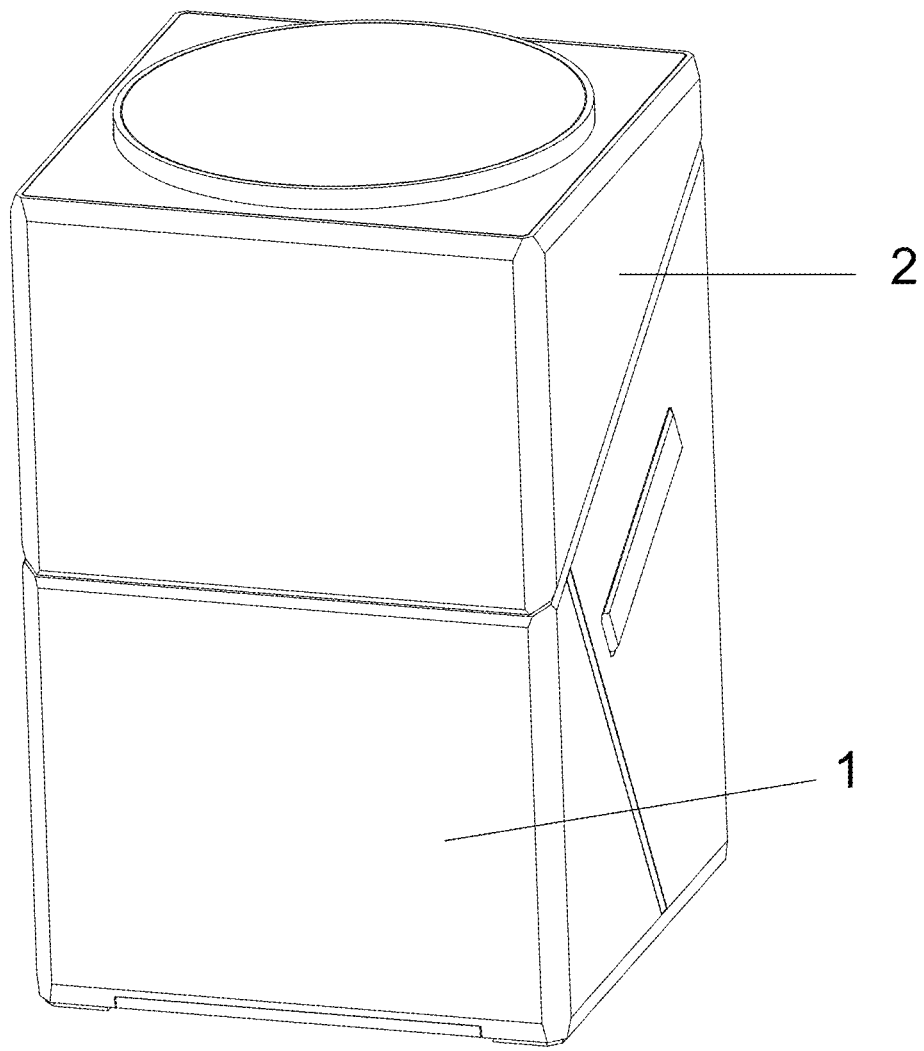
FIG. 3 shows a structure diagram of an embodiment of the present utility model with charging components retracted on both sides.
Figure 4:
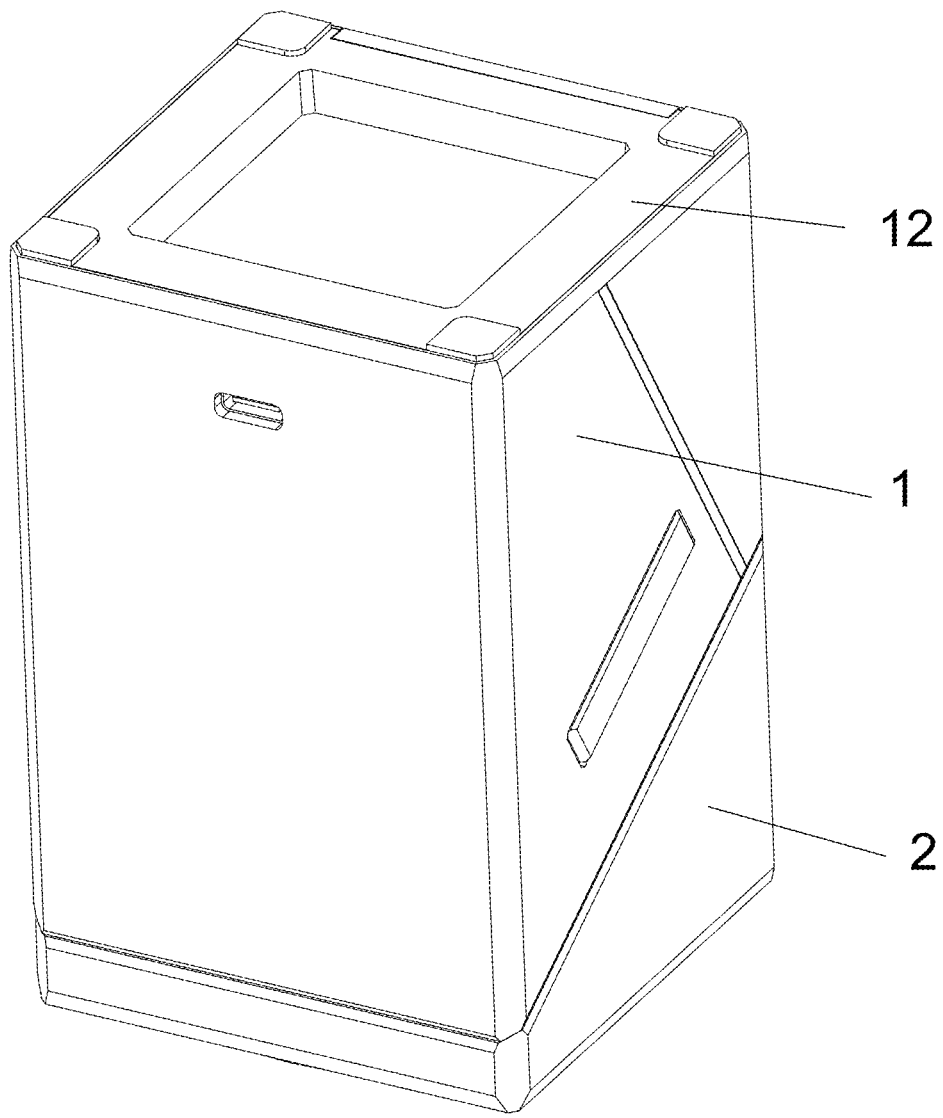
FIG. 4 shows a structure bottom view of an embodiment of the present utility model with charging components extended on both sides.

1. Base; 11. Upper base cover; 12. Lower base cover; 13. Silicone pad;
2. Rotating case; 21. Upper rotating cover; 22. Control board; 23. Rotating motor; 24. Limit stopper;
31. Decorative piece; 32. Mobile phone charging coil; 33. Magnet set;
41. First spring upper seat; 42. First spring lower cover; 43. Upper earphone charging cover; 44. Earphone charging coil; 45. Lower earphone charging cover; 46. Silicone pad;
51. Second spring bottom seat; 52. Second spring upper cover; 53. Upper watch charging cover; 54. Watch charging coil; 55. Lower watch charging cover;
61. Springs; 62. Spring guide shafts; 63. Self-locking switch; 64. Ejecting buckle;
7. Motherboard PCB;
8. Light bar.

DETAILED DESCRIPTION OF PREFERRED EMBODIMENTS

In order to make solved technical issues, technical solutions and beneficial effects regarding the present utility model clearer, the following shows a further detailed description of the present utility model by reference to drawings and embodiments. It should be understood that the preferred embodiments described here are only intended to explain the present utility model and do not mean a limitation to the present utility model.

The following shows a detailed description of the principle and structure of the present utility model by reference to drawings and embodiments.

At present, more and more electronic devices available for work and life appear, some of which, such as mobile phones, watches and Bluetooth earphones, have been provided a wireless charging function. However, existing wireless chargers usually have only one charging port and can only be used for mobile phones or other electronic devices separately, rather than for them simultaneously. In this regard, the present utility model proposes an all-in-one wireless charger that can be simultaneously used for wireless charging of multiple electronic devices. Some wireless charging ports can also be concealed to avoid desktop mess, space occupation and inconvenient transportation and carrying.

Figure 5:
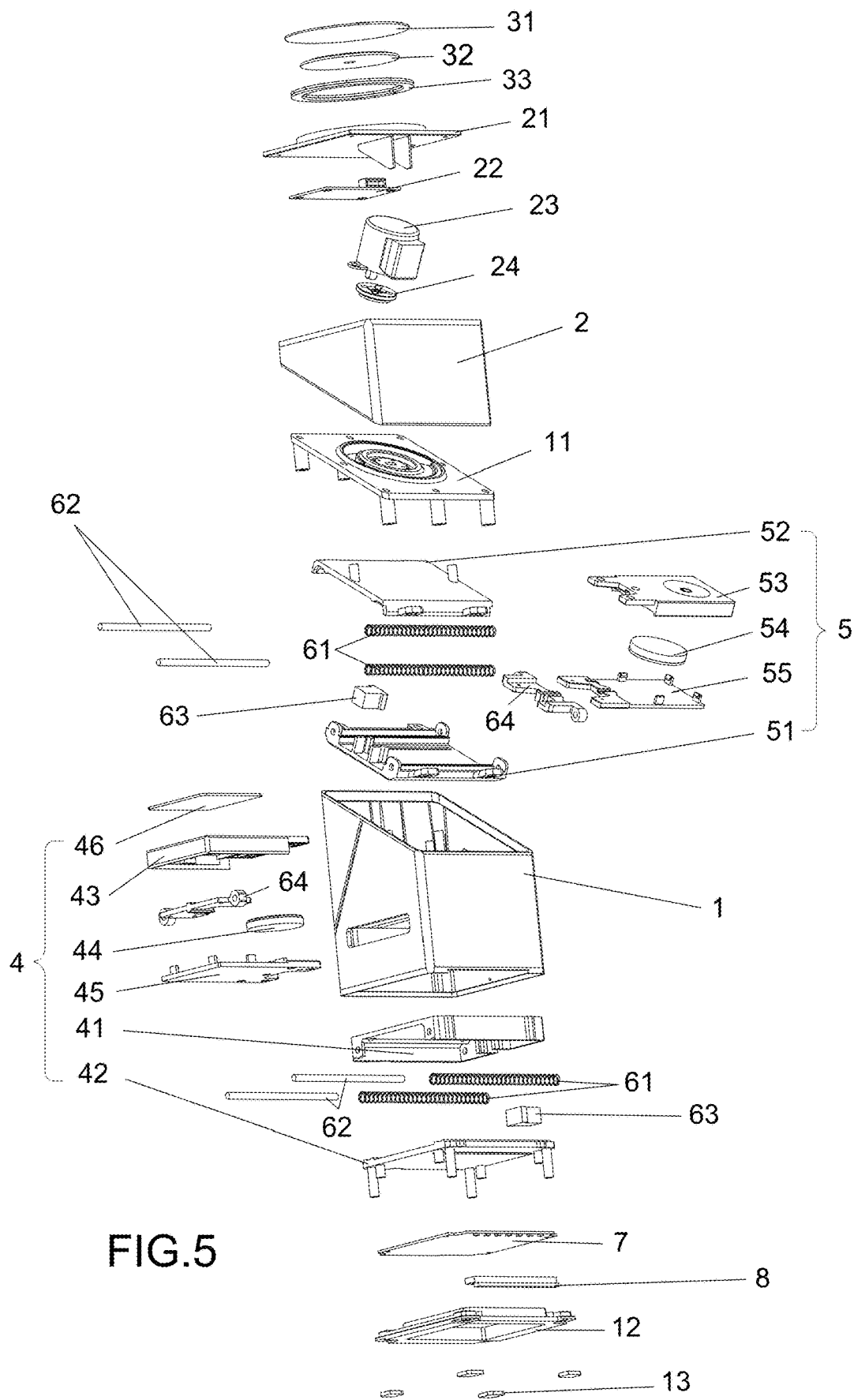
FIG. 5 shows an exploded view of an embodiment of the present utility model.

As shown in FIGS. 1~5, the present utility model discloses an all-in-one wireless charger, comprising: a base 1, a rotating case 2, a first ejecting mechanism, a second ejecting mechanism, an earphone wireless charging component 4, a watch wireless charging component 5 and a motherboard PCB; The base 1 is a rectangular column with the bottom surface perpendicular to the sides and the top surface set obliquely in relation to the bottom surface (i.e. not perpendicular to the sides, with an included angle); The top surface of the base 1 is installed with a upper base cover 11. Since the top surface of the base 1 is a cant, the upper base cover 11 is also oblique after installation; A first opening and a second opening are respectively set at different heights on the left and right sides of the base 1. The bottom surface of the rotating case 2 is a cant matching the top surface of the base 1, and the bottom surface is rotatably connected to the upper base cover 11; The top surface is designed for mobile phone wireless charging, while the inside of the rotating case 2 is provided with a corresponding mobile phone wireless charging component; The tilt angle of the wireless charging surface on the top surface of the rotating case 2 can be adjusted by rotation. The first and second ejecting mechanisms are installed inside the base 1. The ejecting buckles of the first and second ejecting mechanisms are respectively connected to the wireless charging components for earphones and watches; The ejecting buckle ejecting through the first ejecting mechanism can drive the earphone wireless charging component to eject from the first opening. After being ejected, the earphone wireless charging component can be pressed inward by the user to retract from the first opening into the base 1; The ejecting buckle ejecting through the second ejecting mechanism can drive the watch wireless charging component to eject from the second opening. After being ejected, the watch wireless charging component can be pressed inward by the user to retract from the second opening into the base 1;

As shown in FIG. 5, the motherboard PCB is installed inside the base 1 and is electrically connected to the charging coils of the wireless charging components for mobile phones, earphones and watches for charging and control. The detailed circuit structure and wire connection routing do not fall within the protection scope of this application, which are also common in the art and can be used, and therefore, will not be detailed here.

For the all-in-one wireless charger proposed in this utility model, the mobile phone wireless charging surface is set on the top surface of the wireless charger and the top tilt angle of the top surface can be adjusted by rotating the rotating case 2 for meeting different requirements of users. For example, when a user only wants to have his device charged, and the tilt angle of the rotating case 2 is small, which are more helpful for the user's easy charging; If the user wants to use his mobile phone while charging, the rotating case 2 can be controlled to rotate by 180°, enlarging the tilt angle of the mobile phone wireless charging surface and making it easier for the user to use the mobile phone while charging. The all-in-one wireless charger is provided with separate openings at both sides, which can help to respectively eject the wireless charging components for earphones and watches, adding more charging ports for the wireless charger; The wireless charging components for earphones and watches can be pressed back into the base 1 when not in use, making the wireless charger more aesthetically pleasing and portable.

As shown in FIG. 5, in the preferred embodiment, a rotating motor 23 and a control board 22 are installed in the rotating case 2; The control board 22 is set above the rotating motor 23, and the rotating motor 23 is set near the bottom surface of the rotating case 2; The rotating shaft of the rotating motor 23 vertically passes through the bottom surface of the rotating case 2 and is perpendicular to the top surface of the base 1. Limit stoppers 24 are connected to the rotating shaft of the rotating motor 23, and a connection slot is set in the middle of the upper base cover 11; The connection slot is surrounded by threaded holes, and a square motor shaft hole is set in the middle; The limit stoppers 24 are fixed on the connection slot by screws, making the rotating shaft of the rotating motor 23 be fixed to the upper base cover 11 on the top surface of the base 1; The case of the rotating motor 23 can rotate in relation to the rotating shaft, so as long as the rotating motor 23 is controlled, the rotating case 2 can rotate in relation to the base 1; The control board 22 is electrically connected to the motherboard PCB 7, and a rotation button can be set on the base 1. Users can control the rotating motor 23 to rotate forward or backward by 180° by pressing the rotation button to adjust the top surface tilt angle of the rotating case 2.

In addition to the above-mentioned rotation embodiment, the rotating case and base can also be directly connected through rotating shaft jointing; The top surface tilt angle of the rotating case can also be adjusted by manually rotating the rotating case.

In the preferred embodiment, the first opening (transverse) is set parallel to the bottom surface of the base 1, and the second opening (transverse) is set obliquely in relation to the bottom surface of the base 1, namely the earphone wireless charging surface on its upper surface is parallel to the bottom surface of the base 1 after the earphone wireless charging component is ejected, while the watch wireless charging surface on its upper surface is oblique in relation to the bottom surface of the base 1 after the watch wireless charging component is ejected, namely the watch wireless charging surface, to a certain extent, is oblique for placing watches.

In the preferred embodiment, the rotating case 2 and the base 1 form a rectangle as a whole; The top surface is oblique for placing mobile phones; An overall rectangle can make a structure be placed stably and reliably.

Specifically, the structures of the first and second ejecting mechanisms are similar, and the structures of the wireless charging components for watches and earphones are similar, too. It should be noted that many mechanisms in the prior art can extend and retract, and as long as intended for the same purpose and they all fall within the protection scope of this utility model; The first and second ejecting mechanisms can be used in an electric mode or a manual mode, which can be described by reference to two preferred embodiments.

In the first embodiment of the present utility model, in the manual mode:

The first ejecting mechanism includes: a first spring upper seat 41, spring guide shafts 62, springs 61, an ejecting buckle 64 and a first spring lower cover 42; Spring slots are designed near the front and rear sides of the first spring upper seat 41, a self-locking switch 63 is provided at the right end, and both ends of each spring slot are provided with limit stoppers 24 with plugholes; The first spring lower cover 42 is installed below the first spring upper seat 41 to radially seal the spring slots as well as the lower part of the sliding space of the earphone wireless charging component; The spring guide shafts 62 are set between the two limit stoppers 24 of the spring slots and the springs 61 are fit on the spring guide shafts 62; Both ends of the ejecting buckle 64 are provided with ears with guide holes; The upper surface in the middle of the ejecting buckle 64 is connected to the earphone wireless charging component, and a self-locking buckle corresponding to the self-locking switch 63 is provided on one side in the middle of the ejecting buckle 64; The two ears of the ejecting buckle 64 are fit on the spring guide shafts 62; When the earphone wireless charging component is pressed into the first opening, the two ears will slide along the spring guide shafts 62 and compress the spring 61; The watch wireless charging component can move between the two spring slots until the self-locking buckle of the ejecting buckle 64 is locked in conjunction with the self-locking switch 63; When the earphone wireless charging component is set inside the first ejecting mechanism, the upper and lower parts of the wireless charging component are set between the first spring upper seat 41 and first spring lower cover 42, and the front and rear sides are set between two spring slots; The right end is limited by the self-locking switch 63 of the first spring upper seat 41, and the left end faces and seals the first opening.

The structure of the second ejecting mechanism is similar to that of the first ejecting mechanism; The difference is that the seat part with spring slots for installing the spring guide shafts 62 is reverse to the cover part, and the rest parts of the structure are similar, which comprise: a second spring bottom seat 51, spring guide shafts 62, springs 61, an ejecting buckle 64 and a second spring upper cover 52; The second spring bottom seat 51 is provided with horizontally set spring slots on the front and rear sides, a self-locking switch 63 is installed at the left end, and both ends of each spring slot are provided with limit stoppers 24 with plugholes; The spring guide shafts 62 are set between the two limit stoppers 24 of the spring slots and springs 61 are fit on the spring guide shafts 62; Both ends of the ejecting buckle 64 are provided with ears with guide holes; The ears are respectively fit on the two spring guide shafts 62, so that the middle of the ejecting buckle 64 can slide along the spring guide shafts 62 between the two spring slots; The upper surface in the middle of the ejecting buckle 64 is connected to the watch wireless charging component; The left side in the middle of the ejecting buckle 64 has a self-locking buckle corresponding to the self-locking switch 63; When the watch wireless charging component is pressed into the second opening, the ears will slide along the spring guide shafts 62 and compress the springs 61; The watch wireless charging component can move between the two spring slots until the self-locking buckle is locked in conjunction with the self-locking switch 63; The second spring upper cover 52 is installed above the second spring bottom seat 51 to radially seal the spring slots as well as the upper part of the sliding space of the watch wireless charging component;

In the second embodiment of the present utility model, in the electric mode:

It also includes a first electric mechanism and a second electric mechanism that are installed in the base; The first electric mechanism drives the first ejecting mechanism to extend and retract from the first opening, and the second electric mechanism drives the second ejecting mechanism to extend and retract from the second opening.

The transmission of the first electric mechanism driven by gears or belts or chains can make the first ejecting mechanism extend and retract.

If a rack is installed on one side or bottom of the earphone/watch charging lower cover and connected to the transmission gear of the equipped electric mechanism, the running electric mechanism driven by the transmission gear and rack can make the earphone/watch charging lower cover move horizontally and then the ejecting mechanism eject from an opening.

A first switch that triggers the rotation of the first electric mechanism is set outside the case.

The structure and principle of the second electric mechanism are similar to those of the first electric mechanism and a second switch that triggers the rotation of the second electric mechanism is set outside the case.

The first and second electric mechanisms are connected to the main control chip on PCB 7; After receiving a signal triggered by the first or second switch, the main control chip can control the clockwise or counterclockwise rotation of the first and second electric mechanisms, making the first or second ejecting mechanisms eject or retract.

The first and second electric mechanisms are not shown in the drawings, which are involved in an alternative solution to the first embodiment of the present utility model.

The advantage of the electric mode lies in its convenient operation, while the advantage of the manual mode lies in its low cost and high reliability.

Both wireless charging components for earphones and watches include: a charging upper cover and a charging lower cover that are mutually buckled, as well as a charging coil set in the installation space between the charging upper cover and charging lower cover. They are further divided into an earphone charging upper cover 43, an earphone charging lower cover 45, an earphone charging coil 44, a watch charging upper cover 53, a watch charging lower cover 55 and a watch charging coil 54. The earphone charging upper cover 43 is provided with a silicone pad 46 to prevent slipping during earphone charging.

The mobile phone wireless charging component comprises: a decorative piece 31 of the upper rotating cover 21 set on the top surface of the rotating case 2, a mobile phone charging coil 32 set on the inside of the decorative piece 31 and a magnet set 33 set around the mobile phone charging coil 32 (a protruding groove can be set on the upper rotating cover 21 for placing the decorative piece 31, mobile phone charging coil 32 and magnet set 33). The charging port for mobile phones can be stabilized relying on the magnetic attraction of the magnet set 33.

In the preferred embodiment, the bottom surface of the base 1 is provided with a lower base cover 12, and silicone pads 13 are affixed at the four bottom surface corners of the lower base cover 12; A gap is set on one bottom side of the base 1, and a light bar 8 is installed at the gap; The light bar 8 is used to show the light of the charging indicator on the motherboard PCB 7; The motherboard PCB 7 is installed at the bottom of the base 1, which is set below the first spring lower cover 42; Four fixing columns are also set at the bottom of the first spring lower cover 42 to limit the motherboard PCB 7; In addition, the front part of the base 1 is provided with a charging port near the bottom, and the motherboard PCB 7 is provided with a charging socket corresponding to the charging port for connecting an outsourced power supply to the motherboard PCB 7.

It should be noted that the terms used above are only for describing the preferred embodiments, rather than limiting the exemplary embodiments based on the present utility model. As mentioned here, unless otherwise explicitly stated in the context, singular form expressions also imply plural form expressions. In addition, it should be understood that when the terms "include" and/or "comprise" are used in this specification, they indicate the existence of features, steps, operations, devices, components and/or their combinations.

Unless otherwise specified, the relative arrangement, numerical expressions and values regarding the components and steps described in these embodiments do not limit the scope of the present utility model. It should be understood that for the sake of an easy description, the dimensions of each part shown in the drawings are not provided according to the actual proportions. The technologies, methods and devices known to common technicians dealing in the relevant field may not be discussed in detail, however, where appropriate, such technologies, methods and devices should be considered as a part of the authorized specification. In all the examples shown and discussed here, any specific value should be interpreted as merely illustrative rather than a limit. Therefore, other examples of exemplary embodiments may be provided with different values. It should be noted that similar marks and letters represent similar items used in the following drawings, so once an item is defined in one drawing, no further discussions are needed in subsequent drawings.

In the description of the present utility model, it should be understood that the directional words such as "front, rear, upper, lower, left, right", "transverse, upright, vertical, horizontal" and "top, bottom" indicate that the directional or positional relationships are usually based on those shown in the drawings, which are only used for conveniently explaining the present utility model and simplifying the description. If no contrary explanations are made, these directional words do not indicate or imply that the device or components must have a specific direction or be constructed and operated in a specific direction, and therefore cannot be understood as a limitation to the protection scope of the present utility model; The directional words "inside and outside" refer to the inner and outer contours relative to each component.

For ease of description, spatial relative terms such as "on", "above", "on the surface of", "upper" can be used here to describe the spatial positional relationship between devices or features shown in the drawings. It should be understood that the spatial relative terms aim to cover different directions in use or operation in addition to those described in the drawings for the device. For example, if the device in the drawings is inverted, the device described as "above other devices or structures" or "on other devices or structures" will be positioned as "under other devices or structures" or "beneath other devices or structures". Therefore, the exemplary term "above" can include two directions: "above" and "under". The device can also be positioned in different ways (rotated by 90° or in other directions), and the spatial relative description used here can be explained accordingly.

In addition, it should be noted that the use of words such as "first" and "second" to define components only aims to describe the corresponding components separately. Unless otherwise stated, the above words do not have special meanings and therefore cannot be understood as a limitation to the scope of protection of the present utility model. The above-mentioned embodiments are preferred, and not intended to limit the present utility model. For those skilled in the art, the present utility model may have various modifications and variations. Any modifications, equivalent substitutions, improvements made within the spirit and principle of the present utility model shall fall within the protection of the present utility model.

What is claimed is:

1. An all-in-one wireless charger, comprising:
   a base having a top surface being oblique in relation to a bottom surface, the base including an oblique upper cover and first and second openings respectively disposed at different heights on left and right sides respectively;
   a rotating case having a bottom surface being complimentary to the top surface of the base and rotatably connected to the upper cover of the base, the rotating base including a mobile phone wireless charging component;
   a first ejecting mechanism disposed in the base and including an earphone wireless charging component configured to eject from the first opening;
   a second ejecting mechanism including a watch wireless charging component configured to eject from the second opening; and
   a motherboard disposed in the base and electrically connected to the mobile phone, earphone, and watch wireless charging components respectively.

2. The all-in-one wireless charger of claim 1, wherein the rotating case further comprises a rotating motor including a rotating shaft passing through the bottom surface of the rotating case and being perpendicular to the top surface of the base, a control board for controlling the rotating motor, a limit stopper connected to the rotating shaft of the rotating motor, and a connection slot disposed in the upper base cover.

3. The all-in-one wireless charger of claim 1, wherein the first opening is parallel to the bottom surface of the base, and the second opening is oblique in relation to the bottom surface of the base.

4. The all-in-one wireless charger of claim 1, wherein when the rotating case rotates until the top surface thereof is parallel to the bottom surface of the base so that the rotating case and the base form a rectangle.

5. The all-in-one wireless charger of claim 1, wherein the first and second ejecting mechanisms are configured to operate in an electric mode or a manual mode.

6. The all-in-one wireless charger of claim 5, wherein in the electric mode further comprises first and second electric mechanisms disposed in the base wherein the first electric mechanism is configured to drive the first ejecting mechanism to extend out of or retract into the first opening, and the second electric mechanism is configured to drive the second ejecting mechanism to extend out of or retract into the second opening.

7. The all-in-one wireless charger of claim 5, wherein in the manual mode the first ejecting mechanism comprises:
   a first spring upper seat including two spring slots each through front and rear ends and a self-locking switch disposed at one side;
   two spring guide shafts each disposed between the spring slot in the front end and the spring slot in the rear end;
   two springs disposed on the spring guide shafts respectively;
   an ejecting buckle having an upper surface connected to the earphone wireless charging component, the ejecting buckle including two ears at two sides respectively, each ear having a guide hole, and a self-locking buckle corresponding to the self-locking switch disposed on one side wherein the ears are disposed on the spring guide shafts respectively, wherein when the earphone wireless charging component is disposed in the first opening, the ears slide along the spring guide shafts to compress the spring, and wherein the watch wireless charging component is configured to move between the spring slots until the self-locking buckle is locked in conjunction with the self-locking switch; and
   a first spring lower cover disposed under the first spring upper seat and configured to radially seal the spring slots and the earphone wireless charging component.

8. The all-in-one wireless charger of claim 5, wherein in the manual mode the second ejecting mechanism comprises:
   a second spring bottom seat including two spring slots each through front and rear ends and a self-locking switch disposed at one side;
   two spring guide shafts each disposed between the spring slot in the front end and the spring slot in the rear end;
   two springs disposed on the spring guide shafts respectively;
   an ejecting buckle having an upper surface connected to the watch wireless charging component, the ejecting buckle including two ears at two sides respectively, each ear having a guide hole, and a self-locking buckle corresponding to the self-locking switch disposed on one side wherein the ears are disposed on the spring guide shafts respectively, wherein when the watch wireless charging component is disposed in the second opening, the ears slide along the spring guide shafts to compress the spring, and wherein the watch wireless charging component is configured to move between the spring slots until the self-locking buckle is locked in conjunction with the self-locking switch; and
   a second spring upper cover disposed over the second spring bottom seat and configured to radially seal the spring slots and the watch wireless charging component.

9. The all-in-one wireless charger of claim 1, wherein each of the earphone and watch wireless charging components include an upper charging cover, a lower charging cover secured to the upper charging cover, and a charging coil disposed between the upper charging cover and lower charging cover.

10. The all-in-one wireless charger of claim 9, wherein the mobile phone wireless charging component includes a decorative piece disposed on an inner surface of the rotating case, a mobile phone charging coil disposed in the decorative piece, and a magnet disposed around the mobile phone charging coil.

* * * * *